(12) United States Patent
Wu et al.

(10) Patent No.: US 8,411,637 B2
(45) Date of Patent: Apr. 2, 2013

(54) METHOD FOR DIVIDING A SUBCARRIER PERMUTATION ZONE AND AN INFORMATION CONFIGURATION SYSTEM

(75) Inventors: Dongling Wu, Shenzhen (CN); Huajun Jiang, Shenzhen (CN); Gang Qiu, Shenzhen (CN); Shaogui Lu, Shenzhen (CN); Guangtao Han, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 406 days.

(21) Appl. No.: 12/744,321

(22) PCT Filed: Nov. 23, 2007

(86) PCT No.: PCT/CN2007/003320
§ 371 (c)(1),
(2), (4) Date: May 21, 2010

(87) PCT Pub. No.: WO2009/065263
PCT Pub. Date: May 28, 2009

(65) Prior Publication Data
US 2010/0265911 A1 Oct. 21, 2010

(51) Int. Cl.
*H04W 4/00* (2009.01)
(52) U.S. Cl. .......................................... 370/330
(58) Field of Classification Search .................. 370/330, 370/344, 343
See application file for complete search history.

(56) References Cited

U.S. PATENT DOCUMENTS

| | | | | |
|---|---|---|---|---|
| 5,872,820 | A * | 2/1999 | Upadrasta | 375/356 |
| 7,924,794 | B2 * | 4/2011 | Ballarini et al. | 370/338 |
| 7,924,803 | B2 * | 4/2011 | Tao et al. | 370/344 |
| 7,965,618 | B2 * | 6/2011 | Zhou et al. | 370/203 |

FOREIGN PATENT DOCUMENTS

| | | |
|---|---|---|
| JP | 2007510354 A | 4/2007 |
| WO | WO2006000091 A1 | 1/2006 |
| WO | WO2006034577 A1 | 4/2006 |
| WO | WO2007078086 A1 | 7/2007 |

OTHER PUBLICATIONS

IEEE,IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1, 28.2 2006, 8.4.
WiMAX Forum, Mobile WiMAX—Part I: A Technical Overview and Performance Evaluation (Aug. 31, 2006).

(Continued)

*Primary Examiner* — Mark Rinehart
*Assistant Examiner* — Mohammad Anwar
(74) *Attorney, Agent, or Firm* — Bright IP Law Offices

(57) ABSTRACT

A method for dividing a subcarrier permutation zone in an Orthogonal Frequency Division Multiple Access system and an information configuration system for dividing a subcarrier permutation zone in the Orthogonal Frequency Division Multiple Access system are disclosed in the present invention. Wherein, the method for dividing the subcarrier permutation zone includes the following steps: a configuration unit performing configuration to a subcarrier permutation zone division information, and sending the subcarrier permutation zone division information to a configuration synchronization unit; the configuration synchronization unit calculating a configuration effective frame number, and sending the subcarrier permutation zone division information and the configuration effective frame number to a base station; the base station dividing the subcarrier permutation zone according to the subcarrier permutation zone division information and the configuration effective frame number. With the present invention, it can uniformly configure, in the whole network, the frame in which the subcarrier permutation zone appears and the position in the frame, so as to avoid the co-frequency interference between each of the adjacent zones.

18 Claims, 6 Drawing Sheets

OTHER PUBLICATIONS

International Search Report dated Aug. 8, 2008 for PCT/CN2007/003320, filed Jan. 23, 2007 and published as WO 2009/065263, 4 pages.

Japanese Patent Office, Notice of Reasons for Rejection for Japanese Application No. 2010-534338, mailed Aug. 28, 2012.

* cited by examiner

METHOD FOR DIVIDING A SUBCARRIER PERMUTATION ZONE AND AN INFORMATION CONFIGURATION SYSTEM

CROSS REFERENCE TO RELATED APPLICATIONS

This is the U.S. national stage application of PCT/CN20070/003320, filed Nov. 7, 2007, the above application is herein incorporated by reference.

FIELD OF THE INVENTION

The present invention relates to communication field, and particularly, relates to a method for dividing a subcarrier permutation zone in an Orthogonal Frequency Division Multiple Access system and an information configuration system for dividing the subcarrier permutation zone in the Orthogonal Frequency Division Multiple Access system.

BACKGROUND OF THE INVENTION

In recent years, Orthogonal Frequency Division Multiplexing ("OFDM" for short) technology has become a mainstream technology of physical layer technology in wireless communication because it is capable of effectively resisting multipath interference and narrowband interference and has a high spectral efficiency. Compared with Code Division Multiple Access ("CDMA" for short) technology of the 3rd generation, the technology of Orthogonal Frequency Division Multiple Access ("OFDMA" for short) plus Multiple Input Multiple Output ("MIMO" for short) has technical advantages of its nature, and is more suitable for broadband mobile communication system and is generally accepted as one of the core technologies of the next generation mobile communication system. IEEE 802.16e standard, which uses OFDMA technology as the core technology of physical layer and meanwhile takes account of mobility and wideband characteristics, is a powerful competitor of the next generation mobile communication standard.

In order to support co-frequency networking, the 802.16 standard divides one carrier frequency into a plurality of segments, each segment includes a subcarrier set, in which the subcarriers do not overlap with each other, in the carrier frequency. Due to the orthogonality of the OFDM subcarriers, there is no co-frequency interference between adjacent cells using different segments of the same carrier frequency. The precondition of such performance is that the division rule for the subcarriers of each segment must be consistent, i.e., the permutation modes of the subcarriers must be consistent. In general, only when each segment uses, by default, a subcarrier permutation zone of the Partial Usage of Sub-Channels ("PUSC" for short), the above condition can be easily satisfied.

However, in order to support various optional enhancing technologies in the OFDMA physical layer, the 802.16 standard establishes a plurality of permutation methods, including PUSC, Full Usage of Sub-Channels ("FUSC" for short), Full Sub-Channel PUSC, optional FUSC, Adjacent Subcarrier Allocation ("Band AMC" for short), Tile Usage of Sub-Channels-1 ("TUSC1" for short), and Tile Usage of Sub-Channels-2 ("TUSC2" for short). As shown in FIG. 1, these permutation methods can simultaneously appear in one frame and be divided by permutation zones.

As shown in Table 1 and Table 2, respectively, according to the description of 802.16 protocol, in a downlink subframe, the conversion between downlink zones is indicated by a Space Time Coding Downlink Zone Information Element ("STC_DL_ZONE_IE" for short) or an Adaptive Antenna System Downlink Information Element ("AAS_DL_IE" for short) in a Downlink Map ("DL_Map" for short). The OFDMA symbol offset in the above message is an 8-bit field that is used to denote the start position of the zone. It can be seen which zones are in each frame and the OFDMA symbol offset of each zone can be dynamically adjusted in each frame according to a certain strategy.

TABLE 1

STC_DL_ZONE_IE Format Fragment

| Syntax | Size (bit) | Annotation |
|---|---|---|
| STC_DL_ZONE_IE( ){ | — | — |
| Extended DIUC | 4 | STC/DL_ZONE_SWITCH = 0x01 |
| Length | 4 | Length = 0x04 |
| OFDMA symbol offset | 8 | Denotes the start of the zone(counting from the frame preamble and starting from 0) |
| Permutation | 2 | 0b00 = PUSC permutation<br>0b01 = FUSC permutation<br>0b10 = Optional FUSC permutation<br>0b11 = Optional adjacent subcarrier permutation |
| ... | | |
| } | | |

TABLE 2

AAS_DL_IE Format Fragment

| Syntax | Size (bit) | Annotation |
|---|---|---|
| AAS_DL_IE( ){ | — | — |
| Extended DIUC | 4 | AAS = 0x02 |
| Length | 4 | Length = 0x03 |
| OFDMA symbol offset | 8 | Denotes the start of the zone(counting from the frame preamble and starting from 0) |
| Permutation | 2 | 0b00 = PUSC permutation<br>0b01 = FUSC permutation<br>0b10 = Optional FUSC permutation<br>0b11 = Optional adjacent subcarrier permutation |
| ... | | |
| } | | |

If adjacent segments use different permutation modes at the same time, since different permutations correspond to different subcarrier permutation modes, it will inevitably result in that a part of the subcarriers in the used subcarrier sets conflict with each other, which leads to interference between signals on the subcarriers, i.e., the co-frequency interference in a macro sense. Next, the PUSC and Band Adjacent Subcarrier Permutation ("Band AMC" for short) will be taken as examples to explain the situation of mutual conflict between subcarriers of different permutations.

For the PUSC, firstly, a sub-channel is divided into several clusters; each cluster includes 14 consecutive physical subcarriers. Physical clusters are renumbered according to a renumbering sequence so as to form logical clusters. Then, the logical clusters are allocated into sub-channel groups (for 1024 fast Fourier transform ("FFT" for short), the downlink includes 6 sub-channel groups). Data subcarrier mapping is performed according to formula (1):

subcarrier(k,s)=$N_{subchannels} \cdot n_k + \{p_s[n_k \mod N_{subchannels}] + DL\_PermBase\} \mod N_{subchannels}$ (1)

Wherein, $N_{subchannels}$ represents the number of the sub-channels; s represents the serial number of the sub-channel from 0 to $N_{subchannels}-1$; k represents the subcarrier serial number in the sub-channels; $n_k$ represents (k+13·s)mod $N_{subcarriers}$; subcarrier(k,s) represents the sequence number of the physical subcarrier corresponding to the k-th subcarrier in the sub-channel s; $P_s[j]$ represents the sequence obtained by rotating the permutation sequence to the left for s times; DL_PermBase is a number from 0 to 31, which equals to the cell identifier (ID_Cell) corresponding to a training sequence (preamble) for the first zone, and is assigned in the IE of the DL_MAP for other zones.

In addition, as shown in FIG. 2, the positions of pilots are denoted according to the positions defined in the cluster. From FIG. 2 it can be seen that the positions of the pilots are different when the cluster is of different odd/even symbols.

Wherein, the mapping relation of the cluster is:

$$LogicalCluster = \begin{cases} RenumberingSequence(PhysicalCluster) & \text{First DL zone or Use All SC indicator}= 0 \text{ in STC\_DL\_Zone\_IE} \\ RenumberingSequence((PhysicalCluster + 13*DL\_PermBase)\mod N_{clusters}) & \text{Otherwise} \end{cases}$$

The 802.16e protocol-8.4.6.1.2.1.1 could be referred to for the detailed process.

For Band Adjacent Subcarrier Permutation (Band AMC), with the mode of adjacent subcarrier permutation, data subcarriers and pilot subcarriers are allocated on consecutive physical subcarriers. Such a permutation mode is the same to the uplink/downlink. In adjacent subcarrier permutation, the smallest unit is Bin, one Bin being constructed by 9 physically consecutive subcarriers. For 1024FFT, one symbol includes 96 Bins consecutively arranged according to the sequence of from low physical subcarriers to high physical subcarriers, i.e., from 0 to 95.

It can be seen from the above description that the Band AMC is consecutively arranged according to the subcarriers, while the PUSC is discretely arranged according to the subcarriers. Then, in the time duration of one symbol, there is a situation that the logical data/pilot subcarriers of two modes correspond to the same physical subcarrier (i.e. subcarrier conflict).

As shown in FIG. 3, in the case of 1024FFT, the mode of 3 segments Time Division Duplex ("TDD" for short) 2:1 (the ratio of the length of the downlink subframe to the length of the uplink subframe is 2:1) is considered for networking. In different segments, when the zone permutation modes in the same symbol duration are different, "overlapping" area will appear between the segments.

In FIG. 3, in the overlapping area between the PUSC MIMO Zone in segment0 and the Band AMC Zone in segment1, the situation of data being mapped on the same physical subcarrier may appear.

Suppose that the mode for dividing the 3 segments is:

Segment0 occupies subchannel groups (0, 1) and is constructed by the mode of PUSC+PUSC MIMO+Band AMC. The symbol offset of the PUSC Zone is from 1 to 4; the symbol offset of the PUSC MIMO Zone is from 5 to 14; and the symbol offset of the Band AMC Zone is from 15 to 30. The Band AMC Zone uses logical Band0 to logical Band3.

Segment1 occupies sub-channel groups (2, 3) and is constructed by the mode of PUSC+PUSC MIMO+Band AMC. The symbol offset of the PUSC Zone is from 1 to 4; the symbol offset of the PUSC MIMO Zone is from 5 to 8; and the symbol offset of the Band AMC Zone is from 9 to 30. The Band AMC Zone uses logical Band4 to Band7.

From symbol offset 9 (symbol 10) to symbol offset 14 (symbol 15) in the Segment0 and the Segment1 is the overlapping area between the PUSC MIMO Zone and the Band AMC Zone. Upon calculation, there is the situation of several physical subcarriers overlapping in the overlapping area. The specific number of overlapped subcarriers varies according to parameters such as subcarrier permutation base (Permbase), segment identification (SegmentID). In the condition of PermBase=0, SegmentID=0, the number of the overlapped physical subcarriers is more than 90. When the 3 segments are simultaneously considered, the number of the conflicted physical subcarriers is even greater.

To sum up, in the application scenario of a plurality of zones in OFDMA, if each segment independently dispatches the position and the size of each zone, severe co-frequency interference will occur between adjacent zones.

SUMMARY OF THE INVENTION

In view of one or more problems mentioned above, the present invention provides a method for dividing a subcarrier permutation zone in an Orthogonal Frequency Division Multiple Access system and an information configuration system for dividing a subcarrier permutation zone in the Orthogonal Frequency Division Multiple Access system.

The method for dividing the subcarrier permutation zone s in an Orthogonal Frequency Division Multiple Access system according to an embodiment of the present invention comprises the following steps: a configuration unit performing configuration to a subcarrier permutation zone division information, and sending the subcarrier permutation zone division information to a configuration synchronization unit; the configuration synchronization unit calculating a configuration effective frame number, and sending the subcarrier permutation zone division information and the configuration effective frame number to a base station; the base station dividing the subcarrier permutation zone according to the subcarrier permutation zone division information and the configuration effective frame number.

Wherein, the configuration unit represents the subcarrier permutation zone division information by means of a division form of the subcarrier permutation zone. Specifically, the division form of the subcarrier permutation zone includes one or more kinds of the following information: zone type information, a zone distribution period, an offset in the zone distribution period, and a zone start symbol offset.

Wherein, the method of the configuration synchronization unit calculating the configuration effective frame number is adding a current frame number to a maximum delay of sending the subcarrier permutation zone division information to each of the base stations. Specifically, the configuration synchronization unit determines the maximum delay according to the number of the base stations and the specific implementation of the Orthogonal Frequency Division Multiple Access system.

Wherein, the method for dividing the subcarrier permutation zone according to an embodiment of the present invention further comprises the following step: the base station performing dynamic dispatching to each of the subcarrier permutation zones with the same subcarrier permutation mode.

Wherein, the method for dividing the subcarrier permutation zone according to an embodiment of the present invention further comprises the following step: when a user requests to access into the subcarrier permutation zone, the base station judging whether to allow the user to access into the subcarrier permutation zone according to a Carrier to Interference ratio of the user. Wherein, the process of the base station judging whether to allow the user to access comprises the following steps: the base station calculating the bandwidth of the media access control layer allocated to the user according to Carrier to Interference ratio of the user and the residual slots in the subcarrier permutation zone; if the calculated bandwidth of the media access control layer satisfies the quality of service of the user, allowing the user to access the subcarrier permutation zone, otherwise, refusing the user to access the subcarrier permutation zone. Wherein, the residual slots in the subcarrier permutation zone are the residual slots after the quality of service of existing users in the subcarrier permutation zone is satisfied.

Wherein, the method for dividing the subcarrier permutation zone according to an embodiment of the present invention comprises the following steps: the base station judging, according to the quality of service and the channel condition of an accessed user, and the residual slots in target subcarrier permutation zone, whether to allow the accessed user to switch into the target subcarrier permutation zone; and if the residual slots in the target subcarrier permutation zone satisfy the quality of service of the accessed user, and the channel condition of the accessed user allows the accessed user to switch, the base station then performing switching for the accessed user. Wherein, the residual slots in the target subcarrier permutation zone are the residual slots after the quality of service of existing users in the target subcarrier permutation zone is satisfied.

The information configuration system for dividing a subcarrier permutation zone in an Orthogonal Frequency Division Multiple Access system according to an embodiment of the present invention comprises: a configuration unit, configured to perform configuration to a subcarrier permutation zone division information, and to send the subcarrier permutation zone division information to a configuration synchronization unit; the configuration synchronization unit, configured to calculate a configuration effective frame number, and to send the subcarrier permutation zone division information and the configuration effective frame number to a base station.

Wherein, the configuration unit represents the subcarrier permutation zone division information by means of the division form of the subcarrier permutation zone. The division form of the subcarrier permutation zone of subcarriers includes one or more kinds of the following information: zone type information, a zone distribution period, an offset in the zone distribution period and a zone start symbol offset.

Wherein, the method of the configuration synchronization unit calculating the configuration effective frame number is adding a current frame number to the maximum delay of sending the subcarrier permutation zone division information to each of the base stations. Specifically, the configuration synchronization unit determines the maximum delay according to the number of the base stations and the specific implementation of the Orthogonal Frequency Division Multiple Access system.

With the present invention, it can uniformly configure, in the whole network, the frame in which the subcarrier permutation zone appears and the position in the frame, so as to avoid the co-frequency interference between each of the adjacent zones.

BRIEF DESCRIPTION OF THE DRAWINGS

The figures illustrated here provide a further understanding of the present invention and form a part of the application. The exemplary embodiments of the present invention and description thereof are used to explain the present invention without unduly limiting the scope of the invention. Wherein.

DETAILED DESCRIPTION OF EMBODIMENTS

The present invention aims at solving the problem of the co-frequency interference in the application scenario of a plurality of zones in the OFDMA. The present invention provides a method and a system of configuring, uniformly in the whole network, the frame in which the permutation zone appears and the position in the frame (i.e. the method for dividing a subcarrier permutation zone and an information configuration system for dividing the subcarrier permutation zone according to the embodiments of the present invention), which can ensure, in the whole network, the subcarrier permutation modes in all segments are identical at the same time. Besides, the present invention also provides a method for improving the resource utilization rate in a fixed zone.

Figure 1:
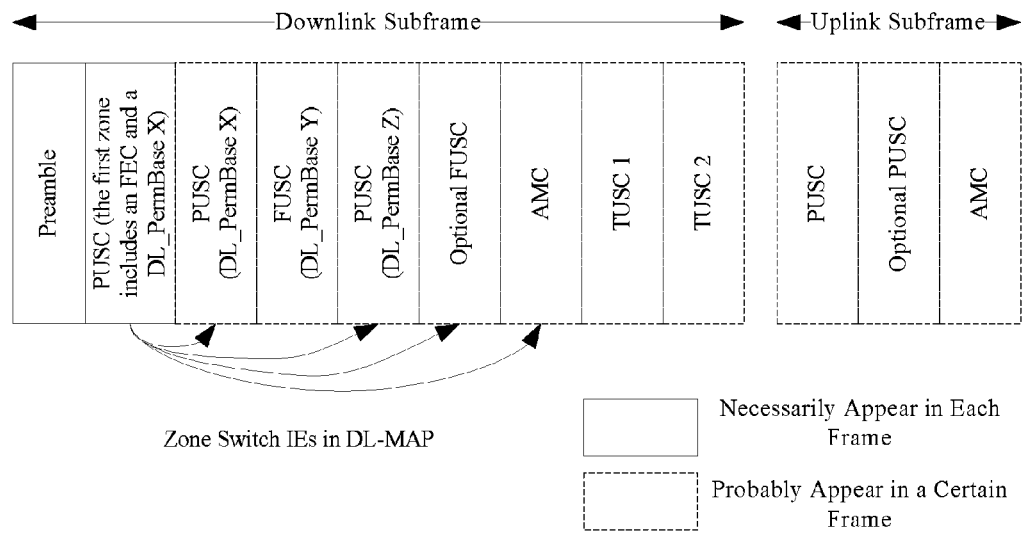
FIG. 1 is a logical structure diagram of an OFDMA frame according to an embodiment of the present invention.
Figure 2:
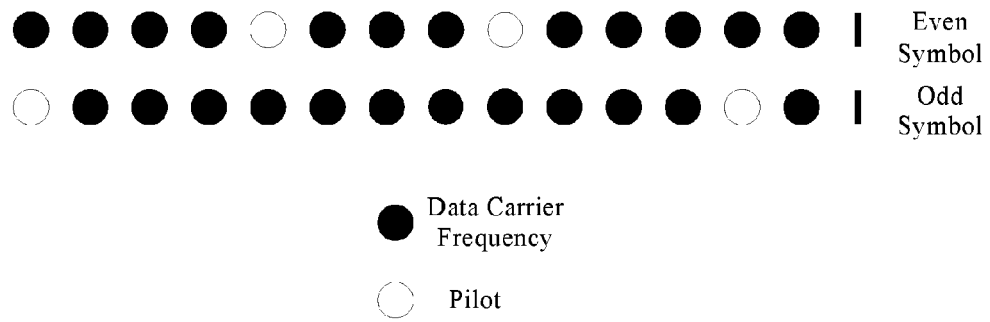
FIG. 2 is a diagram of a cluster structure according to an embodiment of the present invention.
Figure 3:
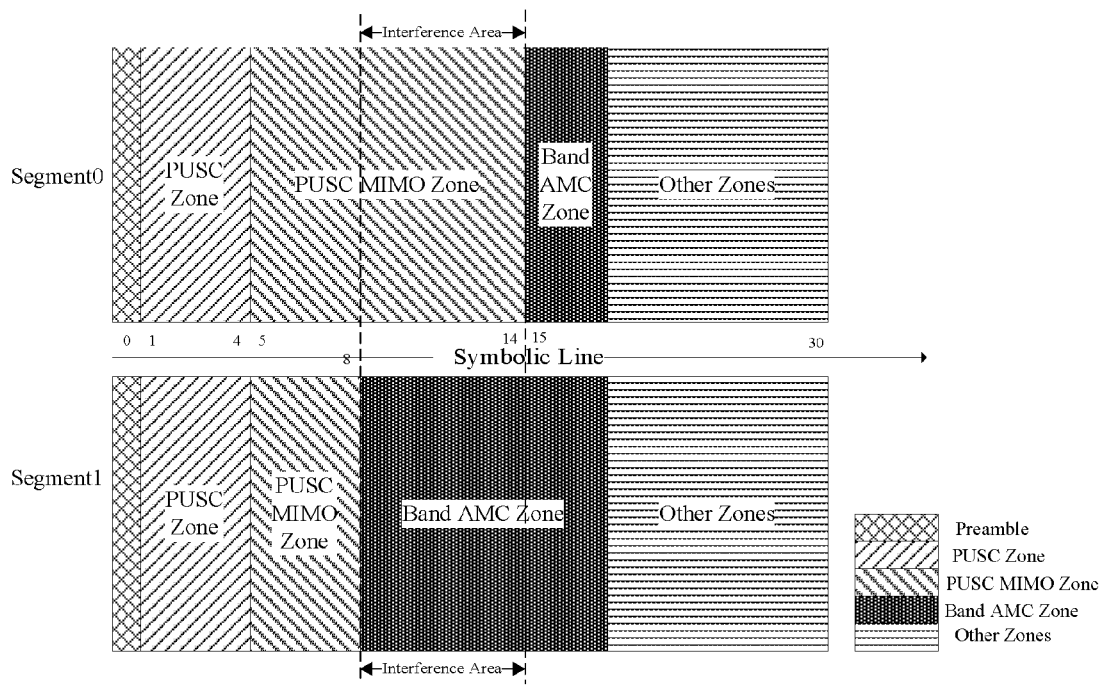
FIG. 3 is a diagram of interference between a plurality of zones in different segments according to an embodiment of the present invention.
Figure 4:
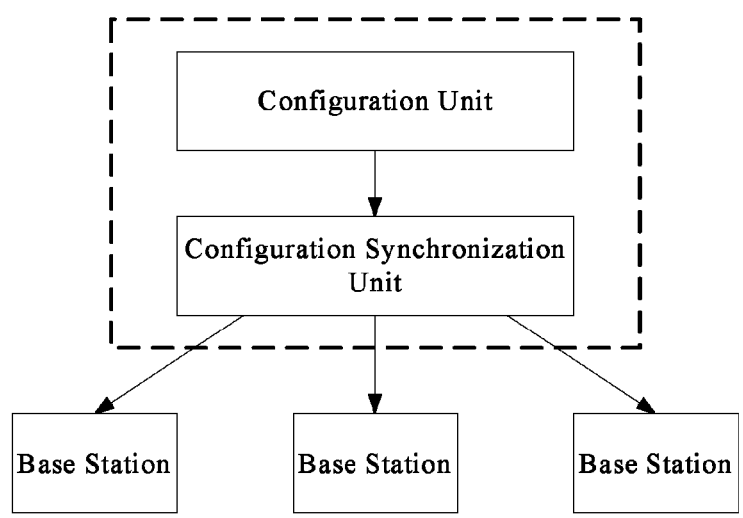
FIG. 4 is a structure diagram in a wireless communication system of a plurality of zones in OFDMA according to an embodiment of the present invention.

As shown in FIG. 4, the system of uniformly configuring, in the whole network, the frame in which the permutation zone appears and the position in the frame, according to an embodiment of the present invention, comprises an operation and maintenance console ("OMC" for short) and base stations, wherein, the OMC is connected to each of the base stations in the whole network, and comprises a configuration unit and a configuration synchronization unit.

Wherein, the method for dividing the permutation zone using the system shown in FIG. 4 comprises the following steps:

A. A Zone Division Form is configured by the configuration unit on the OMC, wherein, the Zone Division Form is in the following format:

TABLE 3

| Zone Division Form Format | | | |
|---|---|---|---|
| Zone Type | Frame Intval | Frame Offset | Symbol Offset |

The Zone Type represents a zone type index, each zone type correspond to a group of zone characteristic parameters, and the subcarrier permutation modes in the zones identified by different zone types are different (such as different Permutation, Permbase and etc.).

The Frame Intval, in the unit of frame, represents the period allocated for the zone, i.e., the zone is allocated in the frame of each Frame Intval.

The Frame Offset represents the offset of the zone in the period of the Frame Intval. The Frame Offset can be a sequence, for example, the Frame Offset={0, 1, 3}. When the Frame Intval=4, and the frame number % the Frame Intval=0, 1, or 3, the zone must be allocated.

The Symbol Offset represents the start symbol offset of the zone in the frame, when Symbol Offset=0, it represents a Preamble. The end symbol of the zone is equal to the start symbol of the next zone−1, and if the next zone does not exist, the end symbol of the zone is equal to the last symbol of the subframe.

Each frame must have the Mandatory PUSC Zone including the FCH and the DL Map according to the 802.16 protocol, and the Symbol Offset=1, the default zone may not be recorded in the above form (or the zone is shown but does not allow to be changed, and represented as PUSC0 in the subsequent description).

B. The configuration unit sends the configuration data to a configuration synchronization unit. The configuration synchronization unit calculates a configuration effective frame number by a method of adding a current frame number to the maximum delay after synchronizing each of the base stations. The delay can be a fixed empirical value, or is related to the number of the base stations that need to be synchronized, and is related to a specific system implementation.

C. The configuration synchronization unit sends the configuration data to each of the base stations, including the Zone Division Form in Step A and the configuration effective frame number in Step B.

D. After receiving the configuration data, each base station, according to the configuration effective frame number, distributes the zone according to new Zone Division Form starting from the configuration effective frame number.

The method can implement the support for any zone, through configuring parameters, which is able to fully utilize the bandwidth of the air interface, and uniformly configure zones in the whole network, and meanwhile keep the number of zones simultaneously distributed in one frame meeting the requirement of the protocol (in the 16e protocol, the number of zones simultaneously included in a downlink subframe is limited). In such a scheme, the zones can be divided according to the actual requirement of business volume, i.e., in one frame, the construction of the Zone Type can be configured, so that the bandwidth utilization rate is relatively high. Absolute frame numbers in the whole network are consistent, and all base transceivers (BTS) are uniformly switched so as to realize a co-channel multi-zone networking in the condition of utilizing the bandwidth as much as possible.

Figure 6:
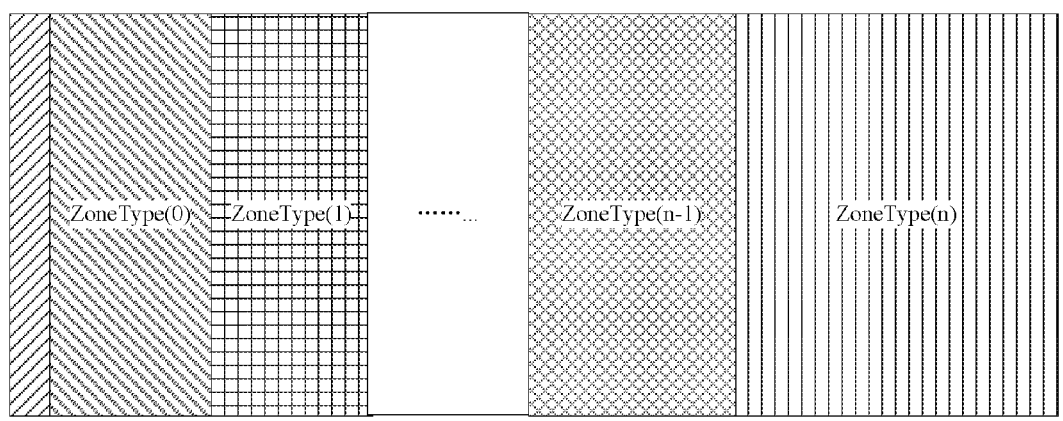
FIG. 6 is an exemplary figure of a dynamic zone division according to another embodiment of the present invention.

The simplest application of the method is dividing the zones in a same subframe. That is, in each subframe, the zone area and the zone position are designated for each kind of the zones, as shown in FIG. 6. The number (n), position (Pos) and size (length in symbol) of the zone can be decided according to the actual requirement. After the zone division, the co-frequency interference will not exist anywhere in the whole network.

Implementing a co-frequency networking using the mode of fixed zone division requires the support of a corresponding dispatching mechanism; otherwise, the utilization rate of wireless resources will be inevitably decreased. Since the zone division is fixed, if the data quantity in a certain zone is relatively small, the resources in this zone will be wasted. In order to solve such a problem, the following method is provided according to an embodiment of the present invention:

1) Performing dynamic dispatching between the zones of the same subcarrier permutation. The zones of the same subcarrier permutation (for example, of the same Permutation and PermBase) are put together upon considering the data allocation. However, the boundary of the Zone-Allocation also needs to be ensured. The utilization of the bandwidth in the zones of the same subcarrier permutation can be ensured to the largest extent by dividing the sizes (positions) of different zones according to the actual quantity requirement of the user. For example, in the PUSC and the PUSC-MIMO, the carrier permutation modes of the two kinds of zones can be the same, but they also need to be divided into 2 zones. In this case, the total resources of the two parts can be considered together so that the actual requirement of the user of the PUSC and the PUSC-MIMO can be well considered, and meanwhile, no interference to the data in other segments is caused.

2) Upon accessing, whether to allow a user to be admitted into the system is judged in the system admission control. The specific method is: the admission control, according to a current Carrier to Interference and Noise ratio ("CINR" for short) of the user (or the supported highest order Modulation and Coding ("MCS" for short), the MCS of terminal can be obtained before the admission flow comes to the admission control) and the number of residual slots after the quality of service (QoS) of existing users in the PUSC-Zone is satisfied, calculates the bandwidth of the media access control (MAC) layer that can be allocated to the terminal. If the bandwidth could meet the QoS requirement of the terminal, then, the user will be admitted into the system; otherwise, the access requirement of the user will be refused. When the PUSC zone cannot admit any new user, it will refuse to admit a user that does not support the PUSC-MIMO. If it is found that the PUSC-MIMO zone also cannot admit any new user, a user that supports the MIMO will be refused. After the user accesses the system, the users will be allocated among the zones to implement load sharing and improve the resource utilization rate.

3) The different zones and the QoS of the terminal are considered for load balancing. After the flow of terminal basic capability negotiation (SBC), though the terminal exchanges supported zone types with the base stations, it does not mean that the terminal can surely run services according to the permutation mode of the zone. For example, one user supports the Band-AMC, but after the terminal accesses the system, a period of time is needed for judging the channel condition to see whether the terminal can run the services according to the mode of the Band-AMC. If all the accessed terminals concentrate in the PUSC-Zone, the bandwidth of the PUSC-Zone will be used up very soon, and the bandwidth of the Band-AMC zone will be wasted. Thus, after the user accesses the system, zone still needs to be switched. The specific method is: the system judges whether to allow the user to be switched into other zones according to the QoS basic requirement of the accessed user and the number of the residual slots after the zone meets the QoS requirement of the existing terminals (meeting the lowest requirement of the QoS) and the channel condition of the user (for example, channel stability). If the residual bandwidth of the corresponding target zone still can meet the QoS of the new users after meeting the QoS of the existing terminals, and the channel condition allows the user to switch zone, the system initiates the switching of the user between the zones, i.e., the user is switched from current zone to a target zone (for example, switching from the PUSC to the AMC).

4) Since the structures of the zones in different frames are different, the residual physical bandwidths of different zones after meeting the QoS as mentioned in the above description are statistic values whose counting period depends on the specific design (or requirement), for example, they can be counted every 0.2 second, 0.5 second, or 1 second, according to the requirement of the actual operating.

Suppose a downlink multi-zone configuration is as shown in Table 4:

TABLE 4

An Example of the Zone Division Configuration

| Zone Type | Frame Intval | Frame Offset | Symbol Offset |
|---|---|---|---|
| 1(pusc1) | 4 | 0 | 11 |
| 2(pusc2) | 4 | 2 | 11 |
| 3(fusc) | 4 | 1 | 13 |
| 4(amc) | 4 | 3 | 15 |
| 5(amc) | 4 | 1 | 15 |

The PUSC0 is a compulsory zone of the downlink subframe. When the absolute frame number FrameNo in the whole network is 4*k, 4*k+1, 4*k+2, 4*k+3, the structures of the downlink subframes are respectively as shown in FIGS. 5A, 5B, 5C, 5D. In the situation of ensuring the consistency of the FrameNo in the whole network, the subcarrier mapping relations corresponding to all base stations (BS) are the same at any time (symbol). Then, the data in the zones will not be interfered. Meanwhile, the number of zones in one frame meets the protocol requirement.

Since there are still a plurality of the different zone types in the time period, then, the resource utilization rate can be improved according to the method of the embodiments of the present invention.

Figure 5A:
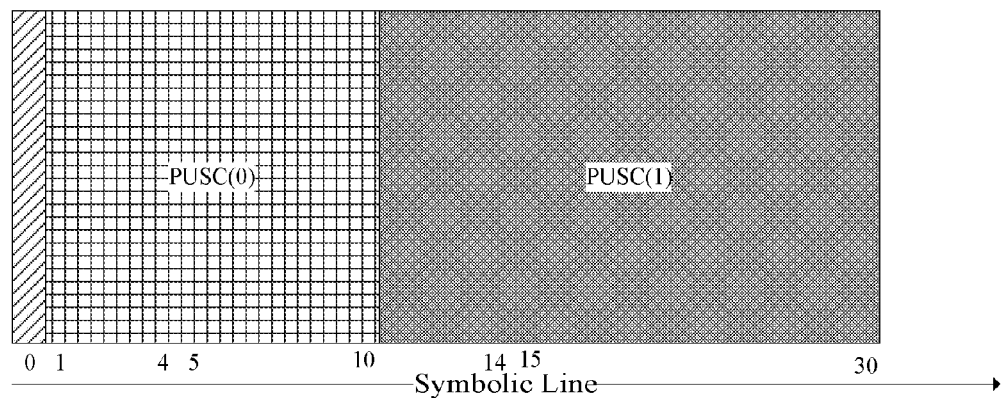
FIG. 5A to FIG. 5D are the exemplary figures of a dynamic zone division according to an embodiment of the present invention.
Figure 5B:
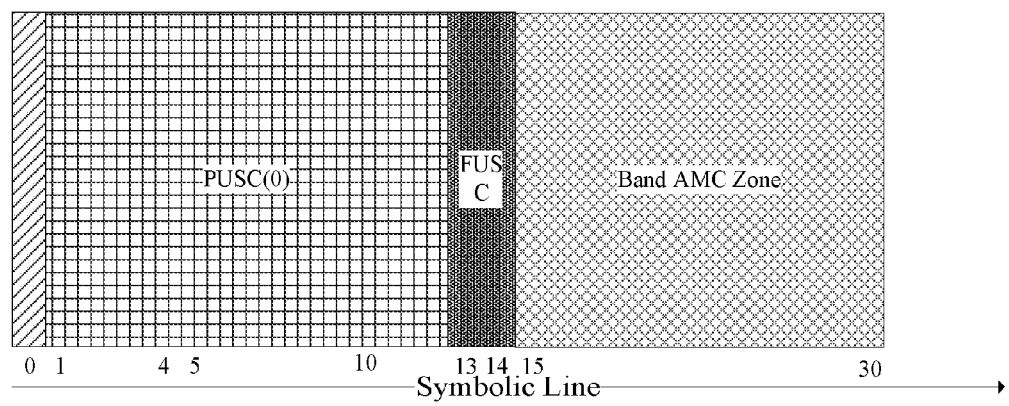
Figure 5C:
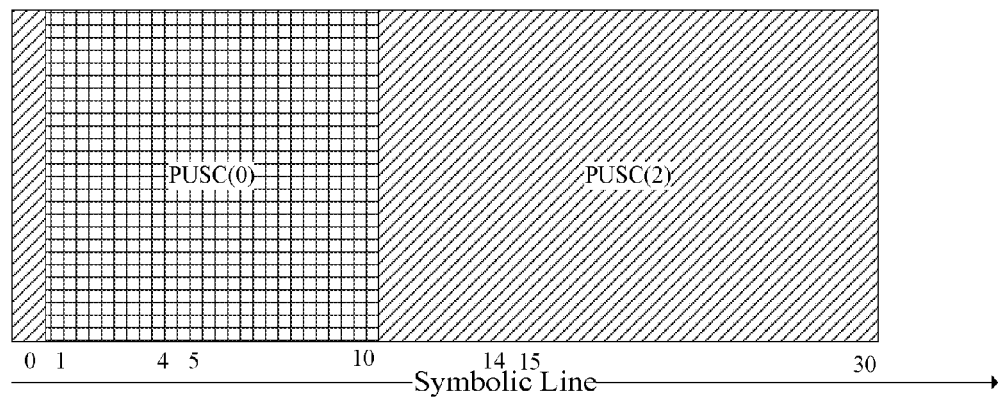
Figure 5D:
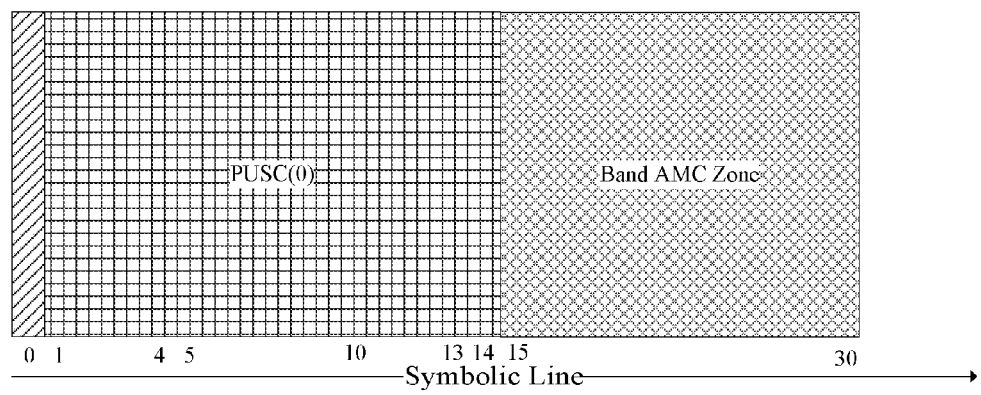

When FrameNo=4*k, the structure of the frame is as shown in FIG. 5A. Presume the PUSC (0) and the PUSC (1) are two zones that have the same subcarrier permutation. But for different applications (for example, the PUSC and the PUSC-MIMO), presume the total bandwidths of the two zones are 300 Slots. At this time, there are two users, namely, user 1 and user 2. User 1 can only be put in zone PUSC (0) and user 2 can only be put in PUSC (1). Consider the following two kinds of situations of the bandwidth requirement of the users: situation 1): the bandwidth requirement of user 1 is 150 Slots, and that of user 2 is 150 Slots; situation 2): the bandwidth requirement of user 1 is 120 Slots, and that of user 2 is 180 Slots.

Compare the methods of the zone division. If the two zones are divided having the sizes (position) of 150 slots and 150 slots, respectively, under the requirement of user situation 1), both users can be satisfied, and the bandwidths will not be wasted; and under the requirement of user situation 2), the requirement of all the 120 slots of the first user can be satisfied, while only 150 slots of the requirement of 180 slots of the second user can be satisfied. Thereby, the 30-slot space in zone PUSC (0) is wasted, and the bandwidth requirement of user 2 is not satisfied. At this time, the system bandwidth is not fully utilized.

If the dynamic dispatching is used, the zone division will depend upon the actual requirements of the users in the zones. After the completion of dispatching, in situation 1), after the data of the users is put into the zones, the PUSC (0) and the PUSC (1) are of the same sizes, i.e. 150 slots. In situation 2), the bandwidth of the PUSC (0) is 120 slots, and the bandwidth of the PUSC (1)-Zone is 180 slots. Comparing the two situations, the positions of the two zones, i.e., the PUSC (0) and the PUSC (1), are changed, which is the dynamic dispatching. This kind of dynamic dispatching not only ensures non-interference between user data in the same subcarrier permutation zones, but also improves the bandwidth utilization rate.

Presume the downlink subframe comprises three zones, which are the PUSC, the PUSC-MIMO, and the Band-AMC, respectively. The zone types supported by a user can be known after the user performs a basic capability negotiation (SBC). The user may only support the PUSC, or also support the MIMO, or the Band-AMC. Since the positions of the different subcarrier permutation zones need to be designated, it may easily cause too many users to be allocated into the PUSC-Zone resulting in that the PUSC-Zone is filled up while other zones are vacant. Load sharing is required with respect to such a situation. The user must pass the admission control upon accessing. In the admission control, whether to allow a new user to be admitted is judged according to the residual bandwidth, the MCS of the user and the zone type supported. For example, when user 0 is trying to access the system, it is found, after the completion of the SBC, that user 0 supports the PUSC, the PUSC-MIMO and the Band-AMC. Then, the system judges the residual bandwidths of different types of zones after satisfying the QoS of the existing users, for instance, the residual bandwidths of PUSC, MIMO and AMC are 20 slots, 30 slots, 30 slots, respectively; and then, the current CINR (FEC) of the user is obtained, for example, it is 16Qam½. The MAC bandwidth that the residual bandwidth of each zone could provide to the user is PUSC=20*6*2*8*200=384 kbps, MIMO=30*6*2*8*200=576 kbps, AMC=30*6*2*8*200=576 kbps, respectively. Presume the bandwidth requirement meeting the QoS of the user is 96 kbps at this time. Since the user supports the MIMO and the AMC modes, and the residual bandwidth provided by any zone can satisfy the QoS bandwidth requirement of the user, it is chosen to admit the user into the system. Since it is not sure that a user can operate according to a non-PUSC mode after accessing the system, it is firstly put into the zone of the PUSC after being admitted. After the admission of the new user, the residual bandwidths of the three zones are 288 kbps, 576 kbps and 576 kbps, respectively. Since the user supports the MIMO, the data of the user can be put into the MIMO zone very soon. After the user is put into the MIMO zone, the residual bandwidths of the three zones are PUSC=384 kbps (restored), MIMO=480 kbps (96 kbps being removed), AMC=576 kbps, respectively. Subsequently, a new user 1 appears. During this period of time, the system finds that user 0 can operate according to the AMC mode, user 0 is transferred from the MIMO-Zone into the AMC-Zone. The residual bandwidths of the zones are renewed after the transfer: PUSC=384 kbps, MIMO=576 kbps (restored), AMC=480 kbps (96 kbps being removed). User 1 supports the PUSC and the MIMO after the SBC, and the QoS requirement is 96 kbps. The system admits the user, and predicts to put it into the MIMO zone, renews the residual bandwidths of the zones: PUSC=288 kbps, MIMO=576 kbps, AMC=480 kbps. Then, a new user 3 appears. After SBC, it is found that the FEC of the PUSC supported by the user also has 16Qam½, and the QoS requirement is 96 kbps. Since the user does not support the MIMO, it can only be put into the PUSC zone. Residual capacities of the zones are continuously renewed: PUSC=172 kbps, MIMO=76 kbps, AMC=480 kbps. Since the user supports the MIMO, if the conditions are satisfied, user 1 is switched from the PUSC-Zone to the MIMO-Zone. The capacities of the zones are renewed: PUSC=288 kbps (96 kbps being added), MIMO=480 kbps, AMC=480 kbps.

Through this method, the spaces of zones differently divided can be effectively utilized, which greatly improves the resource utilization rate.

The above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for dividing a subcarrier permutation zone for a first base station and a second base station in an Orthogonal Frequency Division Multiple Access system, comprising the following steps:
   a configuration unit performing configuration to subcarrier permutation zone division information for the first base station and the second base station, and sending the subcarrier permutation zone division information to a configuration synchronization unit;
   the configuration synchronization unit calculating a configuration effective frame number, wherein the configuration effective frame number is dependent on a maximum time delay required for synchronizing the first base station with the second base station, and sending the subcarrier permutation zone division information and the configuration effective frame number to the first base station and the second base station;
   the first base station dividing its frames into a first plurality of subcarrier permutation zones according to the subcarrier permutation zone division information and the configuration effective frame number; and
   the second base station dividing its frames into a second plurality of subcarrier permutation zones according to the subcarrier permutation zone division information and the configuration effective frame number such that, at any given moment, a first frame associated with the first base station and a first frame associated with the second base station have an identical permutation mode.

2. The method for dividing the subcarrier permutation zone according to claim 1, wherein the configuration unit represents the subcarrier permutation zone division information by means of a division form of the subcarrier permutation zone.

3. The method for dividing the subcarrier permutation zone according to claim 2, wherein the division form of the subcarrier permutation zone includes one or more kinds of the following information: zone type information, a zone distribution period, an offset in the zone distribution period and a zone start symbol offset.

4. The method for dividing the subcarrier permutation zone according to claim 3, wherein the method of the configuration synchronization unit calculating the configuration effective frame number is adding a current frame number to the maximum time delay required for synchronizing the first base station with the second base station.

5. The method for dividing the subcarrier permutation zone according to claim 2, wherein the method of the configuration synchronization unit calculating the configuration effective frame number is adding a current frame number to the maximum time delay required for synchronizing the first base station with the second base station.

6. The method for dividing the subcarrier permutation zone according to claim 1, wherein the method of the configuration synchronization unit calculating the configuration effective frame number is adding a current frame number to the maximum time delay required for synchronizing the first base station with the second base station.

7. The method for dividing the subcarrier permutation zone according to claim 1, wherein the maximum delay is determined according to a number of base stations and a specific implementation of the Orthogonal Frequency Division Multiple Access system.

8. The method for dividing the subcarrier permutation zone according to claim 7, further comprising the following step: each of the first base station and the second base station performing dynamic dispatching to each of the subcarrier permutation zones with the same subcarrier permutation mode.

9. The method for dividing the subcarrier permutation one according to claim 7, further comprising the following step: when a user requests to access into a subcarrier permutation zone associated with a respective one of the first base station and the second base station, the base station judging whether to allow the user to access into the subcarrier permutation zone according to a Carrier to Interference ratio of the user.

10. The method for dividing the subcarrier permutation zone according to claim 9, wherein the process of the base station judging whether to allow the user to access comprises the following steps:
    the base station calculating the bandwidth of the media access control layer allocated to the user according to the Carrier to Interference ratio of the user and residual slots in the subcarrier permutation zone;
    if the calculated bandwidth of the media access control layer satisfies the quality of service of the user, allowing the user to access the subcarrier permutation zone; and
    otherwise, refusing the user to access the subcarrier permutation zone, wherein the residual slots in the subcarrier permutation zone are the residual slots after the quality of service of existing users in the subcarrier permutation zone is satisfied.

11. The method for dividing the subcarrier permutation zone according to claim 7, further comprising the following steps:
    the base station judging, according to the quality of service and the channel condition of an accessed user, and the residual slots in a target subcarrier permutation zone, whether to allow the accessed user to switch into the target subcarrier permutation zone; and
    if the residual slots in the target subcarrier permutation zone satisfy the quality of service of the accessed user, and the channel condition of the accessed user allows the accessed user to switch, the base station performing switching, for the accessed user, wherein the residual slots in the target subcarrier permutation zone are the residual slots after the quality of service of existing users in the target subcarrier permutation zone is satisfied.

12. An information configuration system for dividing a subcarrier permutation zone for a first base station and a second base station in an Orthogonal Frequency Division Multiple Access system, comprising:
    a configuration unit, configured to perform configuration to subcarrier permutation zone division information for the first base station and the second base station, and to send the subcarrier permutation zone division information to a configuration synchronization unit; and
    the configuration synchronization unit, configured to calculate a configuration effective frame number, wherein the configuration effective frame number is dependent on a maximum time delay required for synchronizing the first base station with the second base station, and to send the subcarrier permutation zone division information and the configuration effective frame number to the first base station and the second base station;

wherein the first base station is configured to divide its frames into a first plurality of subcarrier permutation zones according to the subcarrier permutation zone division information and the configuration effective number; and the second base station is configured to divide its frames into second plurality of subcarrier permutation zones according to the subcarrier permutation zone division information and the configuration effective number such that, at any given moment, a first frame associated with the first base station and a first frame associated with the second base station have an identical permutation mode.

13. The information configuration system for dividing the subcarrier permutation zone according to claim 12, wherein the configuration unit represents the subcarrier permutation zone division information by means of a division form of the subcarrier permutation zone.

14. The information configuration system for dividing the subcarrier permutation zone according to claim 13, wherein the division form of the subcarrier permutation zone includes one or more kinds of the following information: zone type information, a zone distribution period, an offset in the zone distribution period and a zone start symbol offset.

15. The information configuration system for dividing the subcarrier permutation zone according to claim 14, wherein the method of the configuration synchronization unit calculating the configuration effective frame number is: adding a current frame number to the maximum time delay required for synchronizing the first base station with the second base station.

16. The information configuration system for dividing the subcarrier permutation zone according to claim 13, wherein the method of the configuration synchronization unit calculating the configuration effective frame number is: adding a current frame number to the maximum time delay required for synchronizing the first base station with the second base station.

17. The information configuration system for dividing the subcarrier permutation zone according to claim 12, wherein the method of the configuration synchronization unit calculating the configuration effective frame number is: adding a current frame number to the maximum time delay required for synchronizing the first base station with the second base station.

18. The information configuration system for dividing the subcarrier permutation zone according to claim 12, wherein the maximum delay is determined according to a number of base stations and a specific implementation of the Orthogonal Frequency Division Multiple Access system.

* * * * *